United States Patent [19]

Becker

[11] Patent Number: 4,951,712

[45] Date of Patent: Aug. 28, 1990

[54] CONTROL SYSTEM FOR A VALVE

[75] Inventor: Manfred A. Becker, Frankenthal, Fed. Rep. of Germany

[73] Assignee: Deere & Company, Moline, Ill.

[21] Appl. No.: 364,762

[22] Filed: Jun. 12, 1989

[30] Foreign Application Priority Data

Jun. 28, 1988 [DE] Fed. Rep. of Germany ....... 3821700

[51] Int. Cl.[5] .......................................... F15B 13/044
[52] U.S. Cl. ............................. 137/636.1; 137/596.17; 251/129.11; 251/297
[58] Field of Search ........................ 137/596.17, 636.1; 251/297, 129.11

[56]  References Cited

U.S. PATENT DOCUMENTS

| 2,466,795 | 4/1949 | Crot ................................... 137/636.1 |
| 3,310,284 | 8/1964 | Inaba et al. . |
| 3,423,935 | 1/1969 | Budzich ....................... 137/636.1 X |
| 3,490,495 | 1/1970 | Green ................................. 137/636.1 |
| 3,709,257 | 9/1970 | Faisandler . |
| 3,875,849 | 4/1975 | Patel . |
| 4,145,956 | 4/1977 | Rumrill et al. . |
| 4,526,342 | 7/1985 | Wakefield ................... 137/625.65 X |
| 4,574,686 | 3/1986 | Budzich ..................... 137/625.65 X |

FOREIGN PATENT DOCUMENTS 2133583  7/1984  United Kingdom ........... 137/625.64

OTHER PUBLICATIONS

Raider et al., "Electromagnetically Controlled Hydraulic Valve", IBM Technical Disclosure Bulletin, vol. 10, No. 5, Oct. 1967.
Author-John Hobbs, H. Hesse-*Electronic/Hydraulic Hitch Control for Agricultural Tractors*, 9 Page SAE Technical Paper Series; International Off-Highway Meeting and Exposition, Mecca, Milwaukee, Sep. 8-11, 1980.

*Primary Examiner*—Gerald A. Michalsky

[57] ABSTRACT

A valve control system includes a stepping motor coupled to an eccentric via a clutch. A valve member is urged into engagement with the eccentric by a spring. Rotation of the eccentric causes axial movement of the valve member which controls fluid flow through the valve. A detent releasably holds the eccentric in a neutral position.

6 Claims, 2 Drawing Sheets

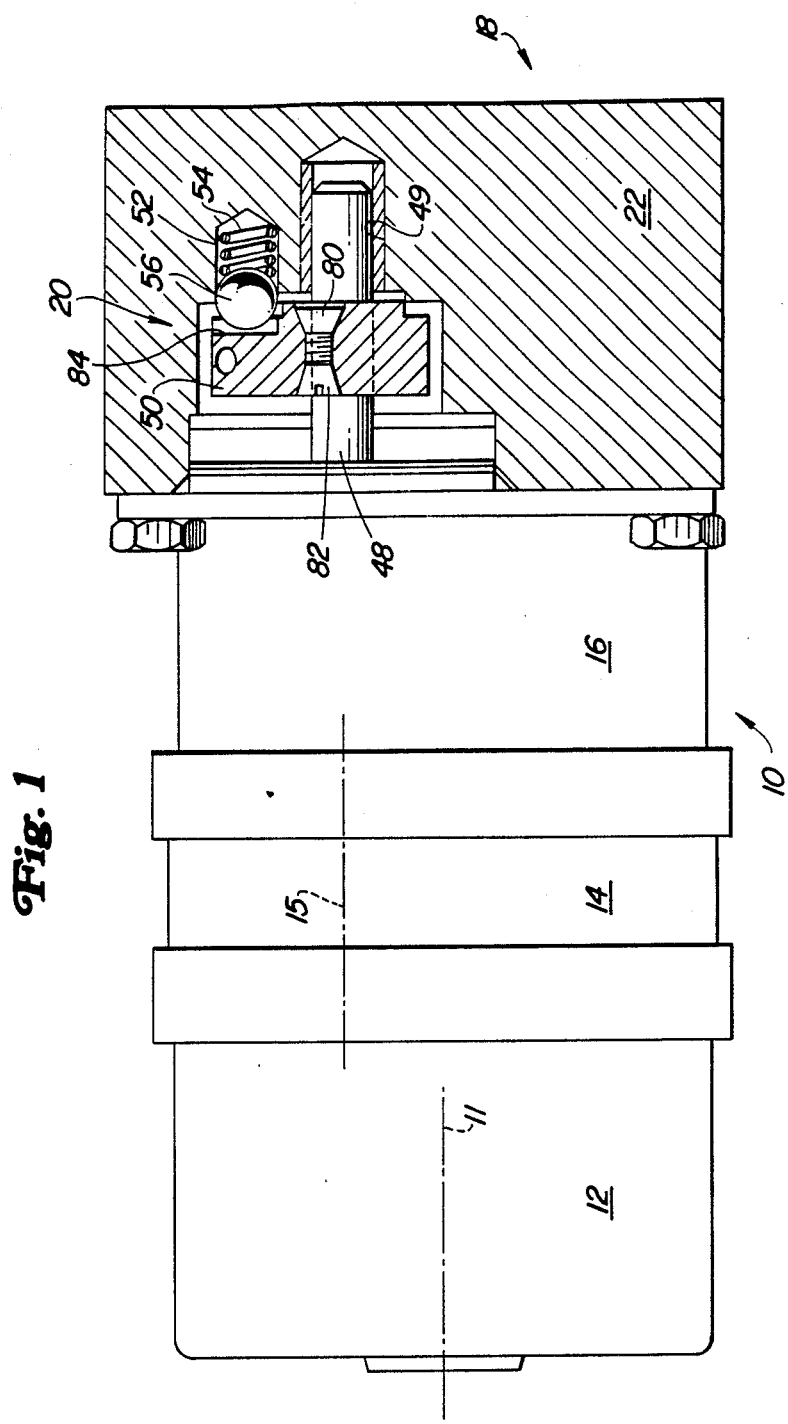

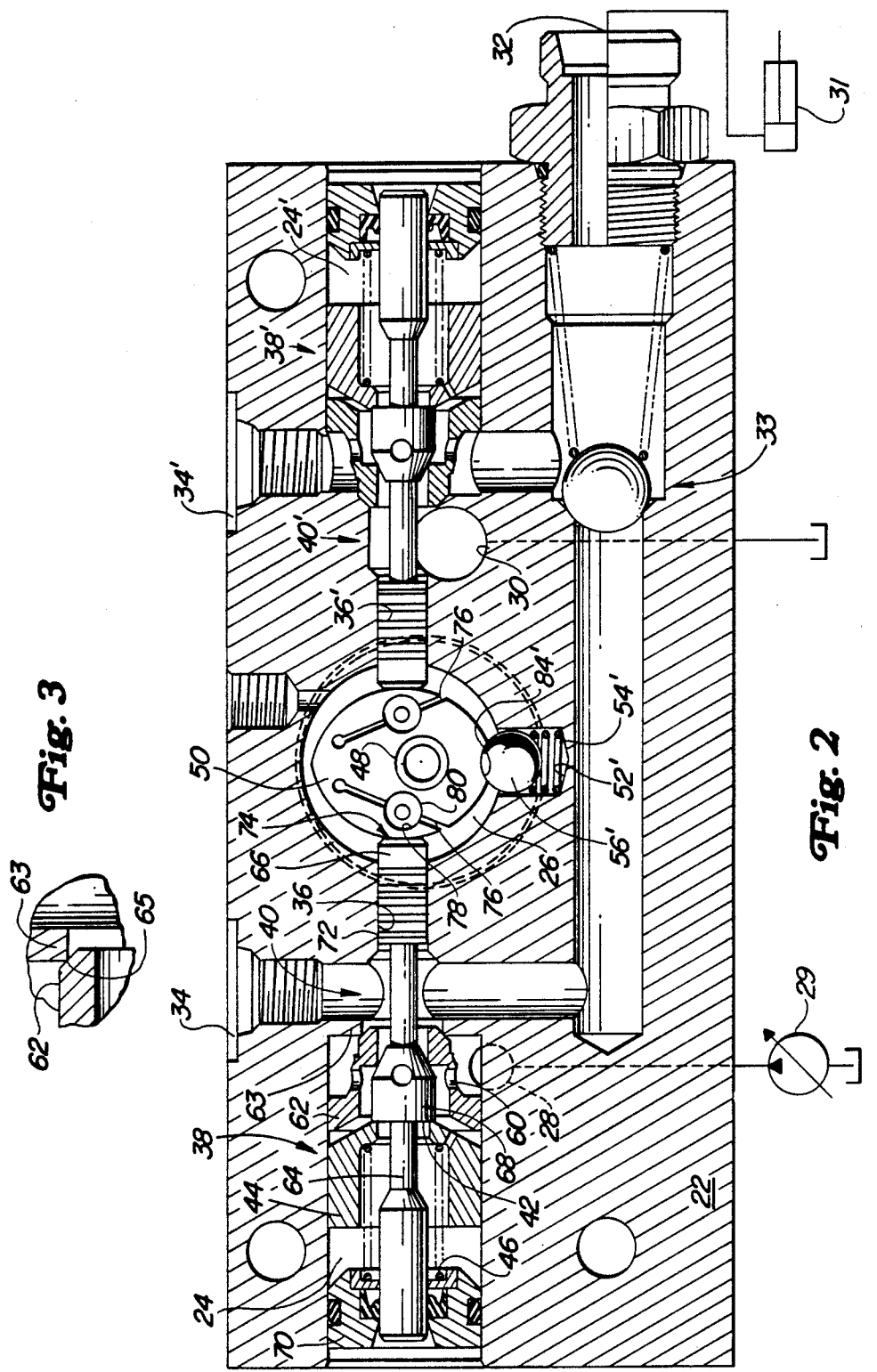

though the operating member 20, there displacing the valve body 40'.

CONTROL SYSTEM FOR A VALVE

BACKGROUND OF THE INVENTION

This invention relates to a control system for a valve, especially a seating valve, whose valve body is displaced into one end position by spring action.

Control systems for valves are known (SAE Technical Paper, Series 801018, Electronic/Hydraulic Hitch Control for Agricultural Tractors), and serve to control the flow of a pressure medium, especially oil, to a load or away therefrom.

On account of the great expenditure of positioning force in such control systems, there are used a three-part main control valve and two separate pre-control valves, the main control valve being set under pressure action controlled by the precontrol valve. The pre-control valve is set to its different positions by means of electromagnets.

Such control systems are expensive and influenced by the tightness of the assembly and by fluid viscosity. The valve adjustment stroke is force-dependent and is therefore influenced by viscosity and back pressure.

SUMMARY OF THE INVENTION

An object of the present invention is to provide a valve control system which is simple but precise in operation.

This and other objects are achieved by the present invention wherein spring-biased fluid flow controlling valve members engage an eccentric mounted on a rotatable shaft. The shaft is coupled to a stepping motor via a clutch and a reduction gear. A detent releasably holds the eccentric in a neutral position. An outer dimension of the eccentric can be adjusted by adjustable spreaders which are received in slots which extend into the eccentric. The end of the shaft 48 is preferably journalled and received in a blind bore 49 which extends into the housing 22 from chamber 26.

BRIEF DESCRIPTION OF THE DRAWINGS

FIG. 1 is a side and partial sectional view of a valve control device according to the present invention.

FIG. 2 is a sectional front view of the present invention.

FIG. 3 is an enlarged view of a portion of FIG. 2.

DETAILED DESCRIPTION

A control device 10 shown in FIG. 1 includes a stepping motor 12, a clutch 14, a reduction gear 16 and a valve unit 18 with an operating member 20, which are each fitted in corresponding housings now described in detail.

The stepping motor 12 is preferably a claw pole motor, which can be digitally controlled and is drivable in two directions and which has a large self-holding force. A center line 11, shown in FIG. 1, indicates the position of its rotor shaft. The control of the stepping motor 12 takes place through a switch, not shown, on an instrument panel by way of an electric circuit, such as the electric circuit for an hydraulically driven three-point hitch of an agricultural tractor, wherein the flow of hydraulic oil to or from the lift cylinder is controlled by the control device 10.

The housings of the stepping motor 12 and the clutch 14 are flanged on to each other. The axis of rotation 15 of the clutch 14 is offset from and parallel to the rotor shaft of the stepping motor 12. The offset can be optionally bridged by a worm or spur gear drive. It is also possible to use a planetary gear so long as this does not have to bridge the offset. The clutch 14 is formed as an electromagnetic clutch and is thus electrically or electronically controllable. The control of the clutch 14 is so selected that it only transfers torque to the valve unit 18 or the operating device 20 thereof, i.e., is engaged when the stepping motor 12 is also operated. In all other cases, such as a drop-out of the power supply system, the clutch 14 is open. This safety control should preferably also be maintained if the clutch 14 is operated mechanically or by means of pressure medium (compressed air, oil). A clutch with positively engaging plates may be used to prevent slip in the clutch 14.

The reduction gear 16 couples clutch 14 to the valve unit 18. The drive runs coaxially through the reduction gear 16, the axis of rotation of the clutch 14 and that of the valve operating device 20. The reduction gear 16 can also be formed as worm, spur or planetary gear.

The valve unit 18 contains a housing 22 with two valve bores 24, 24', a control chamber 26, a pump inlet 28, a return port 30, a load port 32, two connecting ports 34, 34' and two valve body bores 36, 36'. The connecting port 34 can be used as a load sensing connection. The pressure relief of the connecting port 32 takes place by intentional leakage along the wall of the bore 36 into the unpressurized control chamber 26. The load port 32 is closed in the direction of the valve 38 by means of a check valve 38.

In each of the valve bores 24, 24', there is mounted a valve 38, 38' with a valve body 40, 40', which extends through the connecting port 34 or 34', through the valve body bores 36 or 36', into the control chamber 26. The valves 38, 38' are formed identically, therefore only the valve 38 disposed on the left in FIG. 2 will be described hereinafter.

On a shoulder 42 of the valve body 40, there bears a sleeve 44 acting as damping member and a spring 46 which urges the valve body 40 to the right into the control chamber 26. The valve 38 opens or closes the connection between the pump inlet 28 and the connecting and load ports 34 and 32, according to the direction in which the valve body 40 is moved.

The control chamber 26 is located centrally between the two valve bores 24, 24' and has a center line which extends perpendicular to that of the bores 24, 24' and which is parallel to the axis of rotation of the clutch 14 and/or of the reduction gear 16. In this embodiment, the center lines intersect.

The control chamber 26 is a hollow cylindrical cavity which receives the shaft 48 and eccentric 50. A blind bore 52 extends into the housing 22 from an end wall of the control chamber 26. The blind bore 52 receives a spring 54 and a ball 56. The blind bore 52 is arranged so that the spring 54 is compressed and at least half of the ball 56 is received therein. Alternatively, a blind bore 52' may extend into the housing 22 from a peripheral wall of chamber 26, as shown in FIG. 1, with spring 54' and ball 56' received therein. Ball 56 engages groove 84 in eccentric 50, while ball 56' engages groove 84'.

The pump inlet 28 communicates fluid from pump 29 through a bore 60 into a valve member 62 which receives the valve body 40. Depending on the position of the valve body 40, the fluid can flow into the port 34 and from there into the load port 32, whence it reaches a load 31. The flow of fluid out of the port 34' into the return port 30 takes place analogously The valve member 62 sealingly engages a wall 63 between the valve chamber 24 and the port 34. The valve member 62 compensates for possible bore offsets and departures from roundness with its minimal radially movable sealing edge 65. The valve body channel 36 has a smaller diameter and extends coaxially to the valve body 40, whereby between the two, there is a sealing fit in the region of their overlap.

The valve body 40 includes a stem 64, a control piston 66 passing through bore channel 36 and a seating cone 68 with the shoulder 42. The seating cone 68 is tangentially and axially fixed to the stem 64 and can be pressed against a seat in the valve member 62 by means of the spring 46, to interrupt or establish the connection between the port 34 and the pump inlet 28. The stem 64 and the seating cone 68 could be formed as one piece.

The control piston 66 slides in the bore 36, has grooves 72 on its outer periphery for pressure equalization, and has a rounded end surface 74 which intermittently slidably engages the outer surface of the eccentric 50. The rounded end surface 74 could be replaced by a roller or a trapped ball (not shown). Since the object is to allow the relative movement between the valve body 40 and the eccentric 50 with small frictional resistance, there can be provided a lubricating film therebetween.

The spring 46 is formed as a helical compression spring which is biased to urge the sleeve 44 into engagement with the shoulder 42 of the valve body 40, and which engages a plug 70 which sealingly closes the valve bore 24.

The eccentric 50 is mounted on the shaft 48 in line with the center axis of the valve body 40. The axis of the valve body 40 is offset from the center line of the shaft 48. The adjusting force and the stroke are effected by the choice of the line of engagement of the valve body 40 on the eccentric 50 and the curvature of the eccentric 50.

The eccentric 50 includes two slots 76 which extend obliquely from the outer surface of eccentric 50 from a position below the center line of the shaft 48 to a position below and one either side of the top of the eccentric 50. Each of the slots 76 is traversed by a recess 78 opening out conically at both ends, whose center axes run parallel to that of the shaft 48. The conical regions of the recess 78 receives a conical threaded sleeve 80 and a screw 82 with a conical head, which are screwed together. When the conical sleeve 80 is drawn on to the screw, it slides on the conical seat in the recess and exerts a radial force, which has the effect that the parts of the eccentric 50 lying to either side of the slot 76 are moved apart from one another. In this manner, tolerances can be compensated for which influence the tightness at the seat between the valve seat 62 and the seating cone 68 or which prevent abutment of the end surface 74 on the eccentric 50 during the adjusting process or permit this after the adjusting process.

A wedge-shaped groove 84 is provided on an end surface of eccentric 50 or a wedge-shaped groove 85 is provided on an outer peripheral surface of the eccentric 50 so that the ball 56 can enter partially therein, when the eccentric 50 is in a position which corresponds to the neutral position of the two valves, i.e. when a flow of fluid does not take place from or to the connecting ports 34, 34'. The slope of the wedge in the groove 84 can be variously chosen and determines whether or not the ball 56 and the spring 54 coupled thereto assist the eccentric 50 in its movement to the neutral position.

The ball 56 ensures that the end surface 74 is unloaded and the neutral position of the eccentric 50 is reproducibly defined.

Mode of Operation

A command is given through an electric circuit (not shown) to the stepping motor 12 to turn in a given direction. At the same time, the clutch 14 receives the command to engage and transmit the rotational movement from the stepping motor 12 to the reduction gear 16. The reduction gear 16 reduces the speed of rotation so that the operating member 20 rotates with a very small velocity. If no reduction gear 16 is provided, then either the stepping motor 12 itself must rotate with an extremely small velocity, or there must be a speed reduction in the path to the clutch 14. In any event, the eccentric 50 is turned about the center axis of the shaft 48. Since the valve member 40 is pressed on the outer surface of the eccentric 50 by the spring 46, a rotation of the shaft 48 anticlockwise, as seen in FIG. 2, causes a sliding movement of the valve body 40 to the left so that the seating cone 68 lifts from the seat in the valve seat 62 and permits fluid to flow from the pump inlet 28 through the bore 60 and through the interior space of the valve seat 62 into the ports 34 and the load 32.

As soon as the load 31 has been adjusted to the desired degree, a signal is generated by means of a control device (not shown) and the adjustment of the load 31 is terminated and the current feed to the stepping motor 12 and to the clutch 14 is interrupted. In this manner, the operating member 20 is set free, while the stepping motor 12 can rotate a bit further on account of its inertial lag.

After the clutch 14 has been opened, the spring 46 forces the seating cone 68, the stem 64 and the control piston 66 through the sleeve 44 on to the eccentric 50 so that this turns with the shaft 48 towards its neutral position. As eccentric 50 moves into the neutral position, the ball 56 enters the groove 84 under the action of the spring 54 and accurately locates the eccentric in the neutral position.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

I claim:
1. A control valve system comprising:
   a valve housing having a chamber and first and second spaced-apart valve bores extending away from the chamber,
   a pair of valve members, each movable in one of the valve bores to control fluid flow therethrough;
   a pair of operating members, each extending from the chamber into a corresponding one of the valve bores and engaging a corresponding one of the valve members;
   a cam member received in the chamber and having a pair of cam surfaces on opposite sides thereof, each cam surface engaging a corresponding one of the operating means;
   a stepper motor coupled to the cam member, rotation of the stepper motor rotating the cam member thereby moving at least one of the operating mem- bers and the corresponding one of the valve members;

a clutch for coupling, the stepper motor to the cam member only when the stepper motor is operated; and detent means for releasably holding the cam member in its neutral position.

2. The control valve system of claim 1, further comprising:

a pair of resilient members, each acting upon the cam member through the corresponding valve member and operating member to urge the cam member to a neutral position.

3. The control valve system of claim 1, further comprising:

means for adjusting a contour of the cam surfaces of the cam member.

4. The control valve system of claim 1, further comprising:

a shaft coupling the motor to the cam member, the cam member being eccentrically mounted on the shaft.

5. The control system of claim 1, wherein:

the first and second valve bores extend along central axes which are colinear.

6. The control valve system of claim 5, wherein:

the axis of the valve bores are perpendicular to anmd do not intersect an axis of the shaft.

* * * * *